A. M. WILSON.
Mowing Machine.
No. 197. PATENTED JUNE 10, 1837.
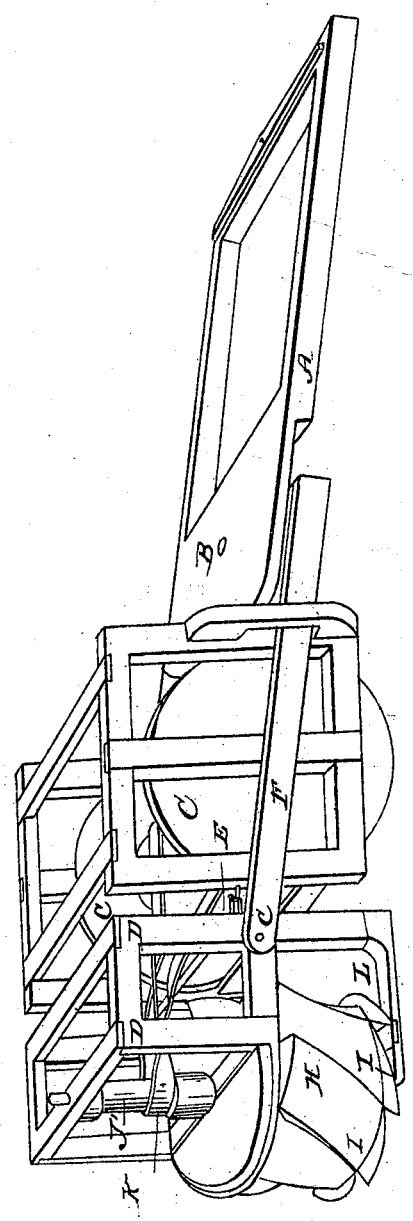

UNITED STATES PATENT OFFICE.

A. M. WILSON, OF RHINEBECK, NEW YORK.

MOWING AND REAPING MACHINE.

Specification forming part of Letters Patent No. 197, dated December 30, 1835; Reissued June 10, 1837.

*To all whom it may concern:*

Be it known that I, ALEXANDER M. WILSON, of Rhinebeck, in the county of Dutchess and State of New York, have invented an Improved Machine for Cutting Grass and Grain; and I do hereby declare that the following is a full and exact description thereof, this description or specification being intended as a substitute for that upon which Letters Patent of the United States were granted unto me dated the 30th day of December, in the year 1835, the said Letters Patent having been deposited by me in the Patent Office on the 29th day of November, 1836, and, as I am informed and verily believe, were destroyed by fire, together with the original specification and drawings thereof, on the 15th day of December of that year.

In my grass and grain cutter, the horses, or other animals, by which it is driven are placed in a suitable frame, or shafts, behind the machine, as in other machines for that purpose previously constructed; which frame, or shafts, is seen at A, in the accompanying drawing. These shafts work, or swivel, upon a pin B, at the hind head of the machine, by which means the direction of the machine may be changed, by changing the position of the animals in driving. The frame of this machine may be put together in various ways, which need not be described.

C, C, are the two ground, or driving, wheels upon which the machine is to run, and which are firmly attached to the axle, by which the gathering wheel and the knives, or cutters, are to driven.

There is a frame D, D, in front of the main frame of the driving wheels. The two frames are connected together by loops, or hinge-joints E, E, a sufficient distance being allowed between them to admit of the front frame, carrying the mowing apparatus, to adapt itself to any irregularity in the surface of the ground. To this front frame D, D, the driving power is applied, through the medium of side timbers F, attached thereto by pins, or bolts, G; so that the front frame may be said to draw the hind frame after it by means of the hinge joints E, E. The front frame D, D, supports the gathering wheel with the knives, or cutters, on to its under side.

H, is what I denominate the gathering wheel, which, on an ordinary sized machine, may be six feet in diameter, and two and a half in height, its diameter being about a foot greater at top, than below. On its periphery, there is a number of offsets, generally from three to six, which extend from the lower to the upper side, obliquely, in the manner shown in the drawing; they run off to nothing below, and extend out about six inches above, making the difference between the upper and lower diameters; the gathering sides of these offsets are in the direction of the radii of the wheel.

To the under side of the gathering wheel knives, or cutters, I, I, are attached, the same in number with the offsets on the gathering wheel, and curving out therefrom so as to stand, at their back ends, at about the same distance as the offsets on the upper side of the gathering wheel; they, however, may be regulated in this particular, according to circumstances. A shaft, J, passes through the gathering wheel, and is firmly attached to it; this shaft runs in a collar above, and in a suitable step below.

K, is a belt leading from a drum, or whirl, on the axle of the ground wheels, to a whirl upon the shaft J. Any suitable gearing may, however, be substituted for this band.

L, is a runner attached to the frame D, D, there being another on the opposite side. These runners raise the knives to a proper height from the ground, and, being curved on their soles, aid, with the action of the joints E, E, to enable the cutter wheel to adapt itself to any inequalities in the ground. There is a cross piece extending from one runner to the other, having on it the step in which the shaft J, revolves.

When this machine is propelled forward, the offsets in the gathering wheel take hold of the grass, or grain, the revolution of the wheel being in the proper direction for their so doing, while the knives, or cutters, perform the operation of mowing, or reaping.

What I claim as my invention in the foregoing machine is—

The construction of what I have denominated the gathering wheel, with its offsets, made in the way described, and having knives, or cutters, attached to its lower side; the whole formed, and operating, substantially in the manner herein fully shown.

ALEX. M. WILSON.

Witnesses:
  THOS. P. JONES,
  HAZARD KNOWLES.

[FIRST PRINTED 1914.]